US010502236B2

United States Patent
Mosiewicz

(10) Patent No.: US 10,502,236 B2
(45) Date of Patent: Dec. 10, 2019

(54) BLADE FOR INDUSTRIAL AXIAL FAN AND INDUSTRIAL AXIAL FAN COMPRISING SUCH BLADE

(71) Applicant: R.E.M. HOLDING S.R.L., Milan (IT)

(72) Inventor: Roberto Edoardo Mosiewicz, Arona (IT)

(73) Assignee: R.E.M. HOLDING S.R.L., Milan (IT)

( * ) Notice: Subject to any disclaimer, the term of this patent is extended or adjusted under 35 U.S.C. 154(b) by 349 days.

(21) Appl. No.: 15/309,870

(22) PCT Filed: May 13, 2014

(86) PCT No.: PCT/EP2014/059782
§ 371 (c)(1),
(2) Date: Nov. 9, 2016

(87) PCT Pub. No.: WO2015/172820
PCT Pub. Date: Nov. 19, 2015

(65) Prior Publication Data
US 2017/0146022 A1    May 25, 2017

(51) Int. Cl.
*F04D 29/66* (2006.01)
*F04D 19/00* (2006.01)
(Continued)

(52) U.S. Cl.
CPC ......... *F04D 29/668* (2013.01); *F04D 19/002* (2013.01); *F04D 29/362* (2013.01);
(Continued)

(58) Field of Classification Search
CPC ...... F04D 29/36; F04D 29/366; F04D 29/382; F04D 29/668; F04D 25/088; F01D 5/00;
(Continued)

(56) References Cited

U.S. PATENT DOCUMENTS 3,044,746 A    7/1962  Stargardter
3,825,369 A *  7/1974  Albertzart ............. F04D 29/388
                                                      416/210 R
(Continued)

FOREIGN PATENT DOCUMENTS

EP    1536145 A2 *  6/2005  ............. F04D 29/34
GB    1473417 A     5/1977
(Continued)

OTHER PUBLICATIONS

I-beam—Wikipedia, the free encyclopedia (Year: 2012).*
(Continued)

*Primary Examiner* — David E Sosnowski
*Assistant Examiner* — Maranatha Boardman
(74) *Attorney, Agent, or Firm* — Abelman, Frayne & Schwab

(57) ABSTRACT

A blade for an industrial axial fan including an attachment and an airfoil having a longitudinal axis, the attachment connecting the airfoil to a hub, wherein the attachment has a stiffness and a stiffness distribution that allows the attachment to deform in a way to have at least an inflection point along the longitudinal axis during the operation of the axial fan. The attachment includes a first part for connection to the hub and a second part for connection to a proximal end of the airfoil. The blade further includes a weight fixed at a distal end of the airfoil. The attachment has a decreasing stiffness along its longitudinal direction from the first part to the second part so that during the operation of the axial fan, the attachment deforms and includes the inflection point to thereby induce the blade to vibrate according to a second vibrating mode.

19 Claims, 9 Drawing Sheets

(51) Int. Cl.
*F04D 29/36* (2006.01)
*F04D 29/38* (2006.01)

(52) U.S. Cl.
CPC ...... *F04D 29/382* (2013.01); *F05D 2240/301* (2013.01); *F05D 2300/501* (2013.01); *F05D 2300/603* (2013.01); *Y02T 50/673* (2013.01)

(58) Field of Classification Search
CPC ... F01D 5/045; F01D 5/10; F01D 5/16; F01D 5/26; F01D 25/04; F01D 25/06
See application file for complete search history.

(56) References Cited

U.S. PATENT DOCUMENTS

| | | | | |
|---|---|---|---|---|
| 5,304,037 | A * | 4/1994 | Scofield | F04D 29/34 416/134 R |
| 5,433,585 | A * | 7/1995 | Yan | F04D 29/34 416/204 R |
| 5,988,978 | A * | 11/1999 | Pearce | F04D 29/662 416/145 |
| 6,715,989 | B2 * | 4/2004 | Mosiewicz | F04D 29/023 416/134 R |
| 7,500,831 | B2 * | 3/2009 | Pearce | F04D 25/088 416/204 R |
| 8,047,795 | B2 * | 11/2011 | Pearce | F04D 29/34 416/210 R |
| 8,177,512 | B2 * | 5/2012 | Mosiewicz | F04D 29/382 416/204 R |
| 2003/0231960 | A1 * | 12/2003 | Asada | F04D 29/023 416/210 R |
| 2005/0115267 | A1 | 6/2005 | Lee et al. | |
| 2007/0041829 | A1 | 2/2007 | Bonnet | |
| 2007/0110578 | A1 | 5/2007 | Stommel | |
| 2018/0291913 | A1 * | 10/2018 | Mosiewicz | F04D 29/34 |

FOREIGN PATENT DOCUMENTS

| | | |
|---|---|---|
| JP | 2002195190 A | 7/2002 |
| JP | 2008248700 A * | 10/2008 |
| WO | 2012110486 A1 | 8/2012 |

OTHER PUBLICATIONS

International Preliminary Report on Patentability, dated Sep. 1, 2016 from related PCT Application No. PCT/EP2014/059782, filed May 13, 2014.

* cited by examiner

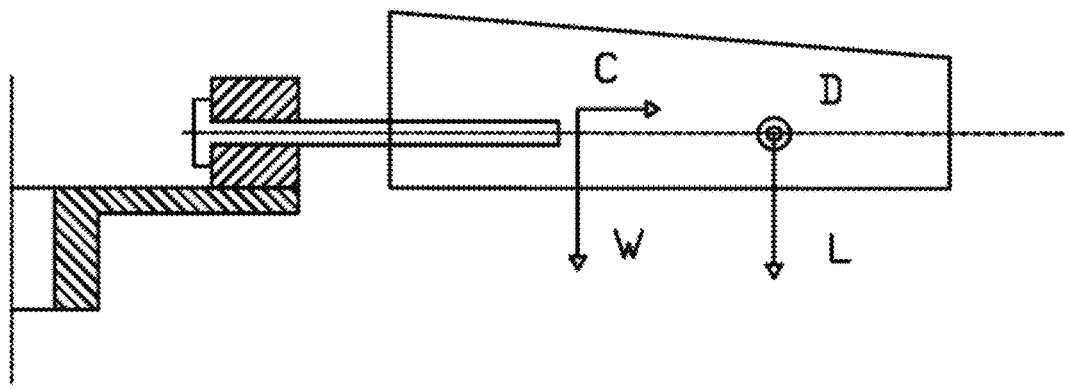
Figure 1a – Prior art
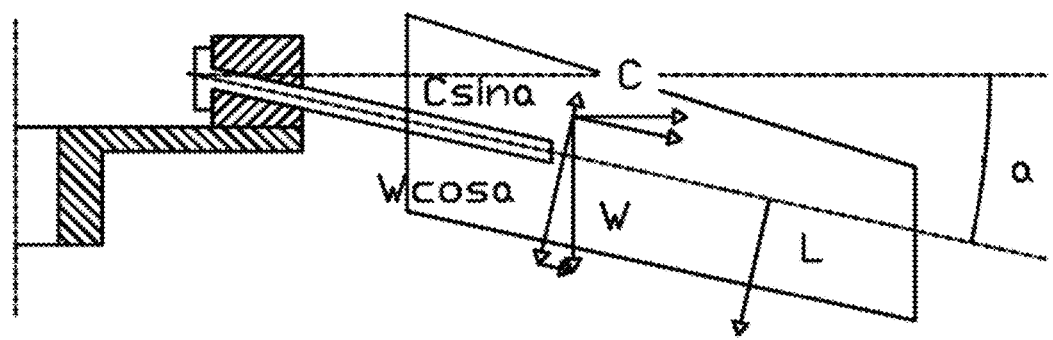
Figure 1b – Prior art

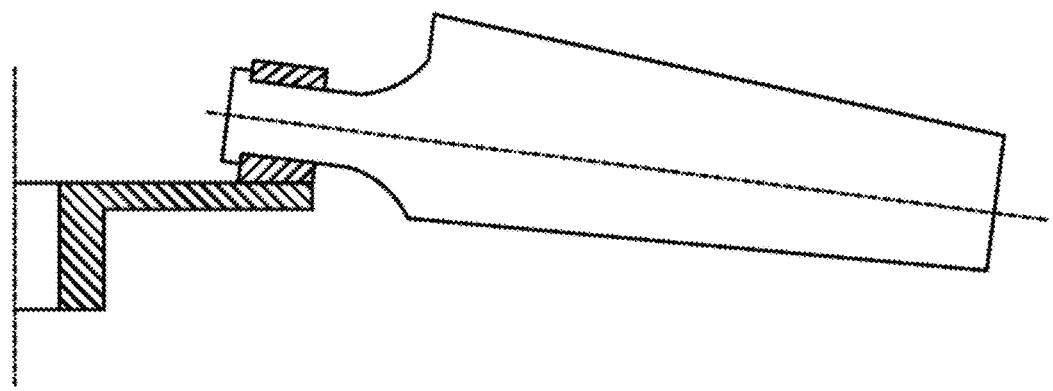
Figure 2a – Prior art
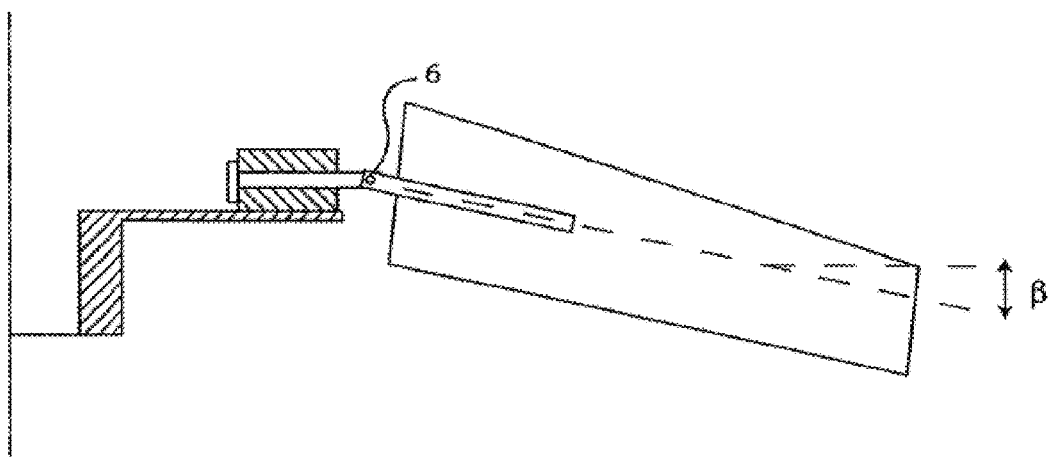
Figure 2b – Prior art

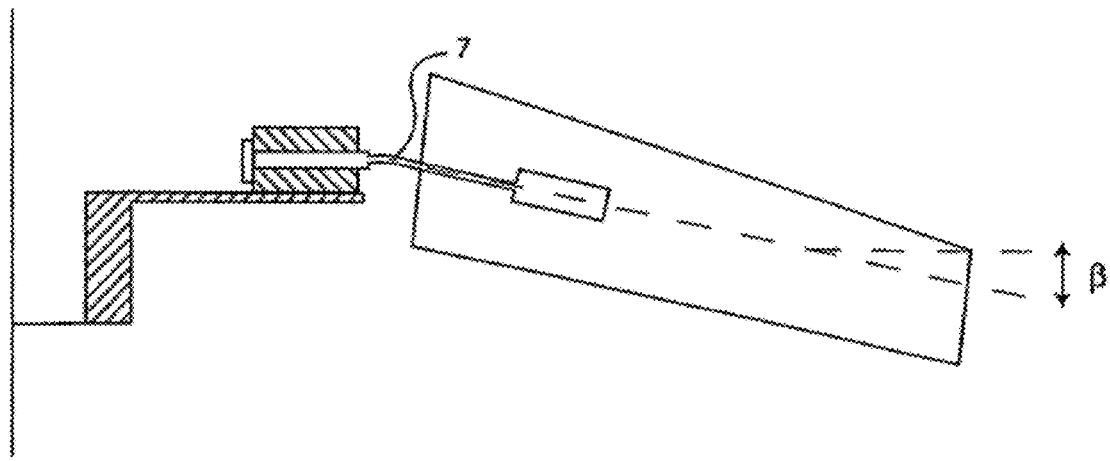
Figure 2c – Prior art
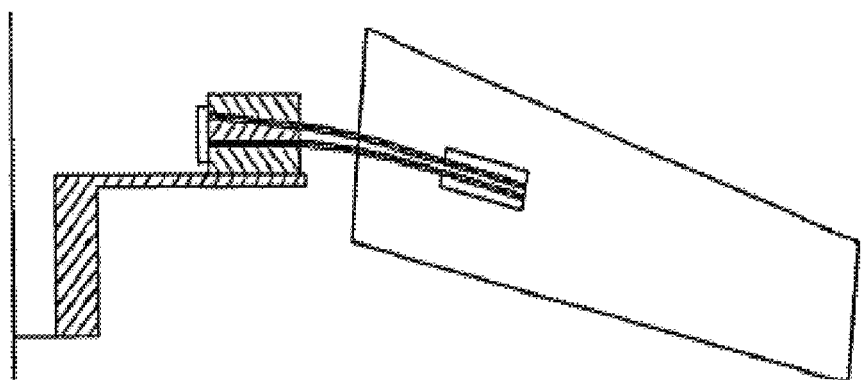
Figure 2d – Prior art

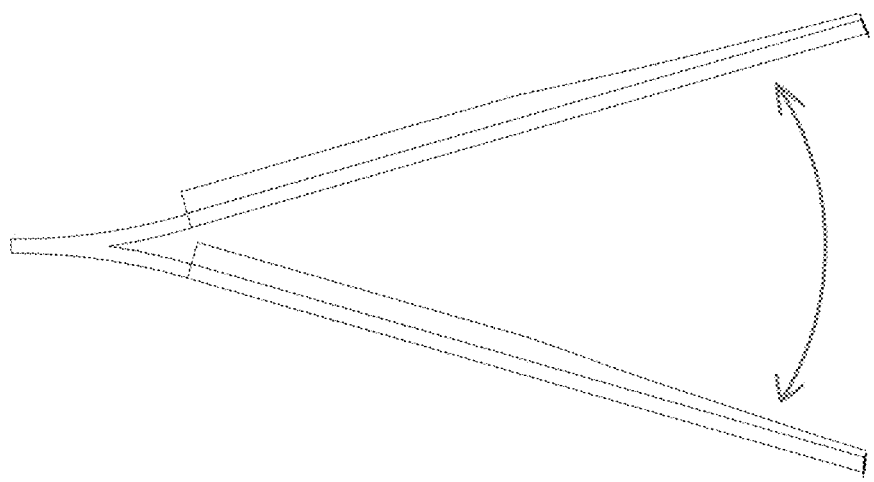
Figure 3a – Prior art
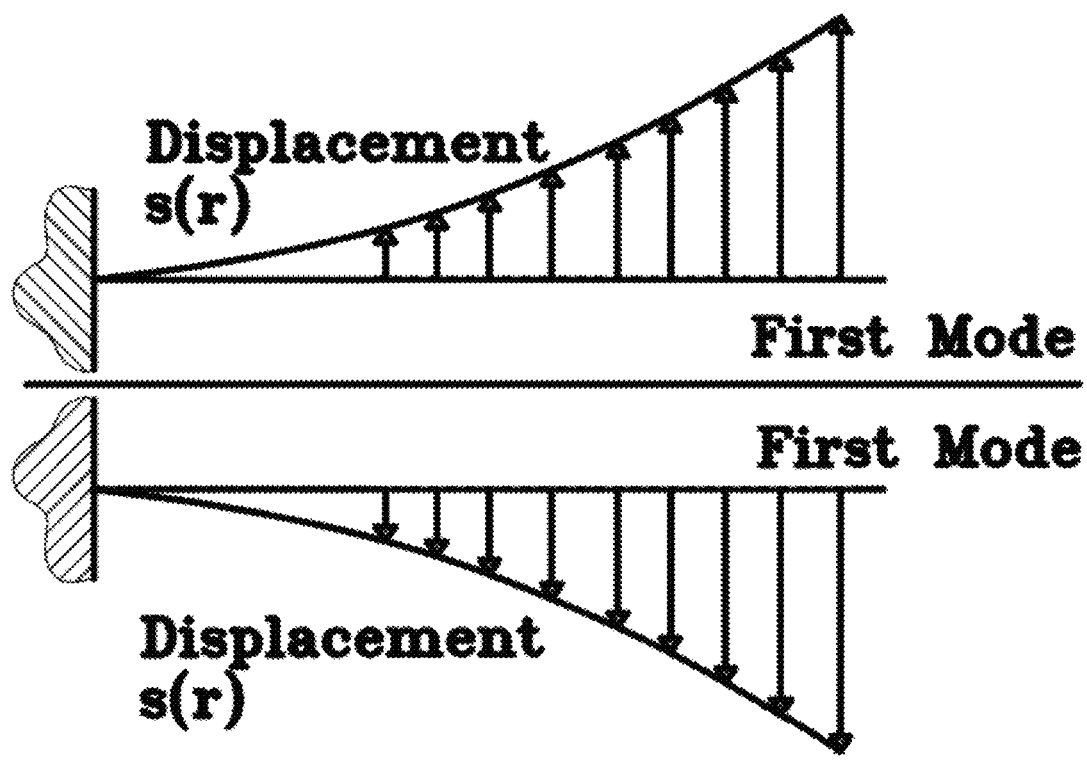
Figure 3b

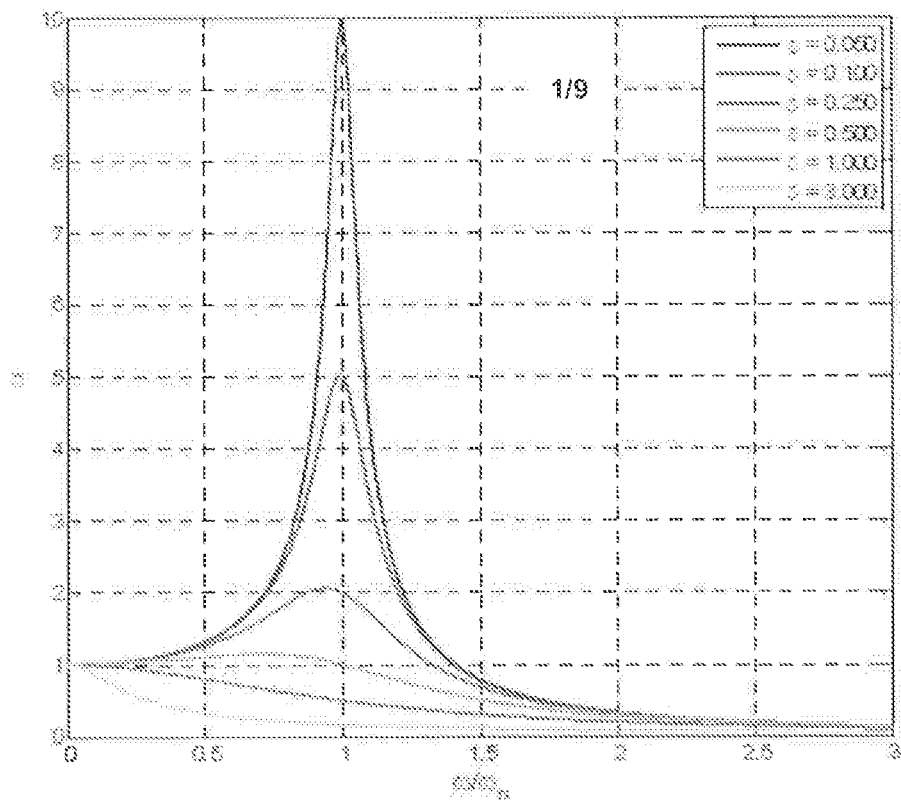
Figure 5
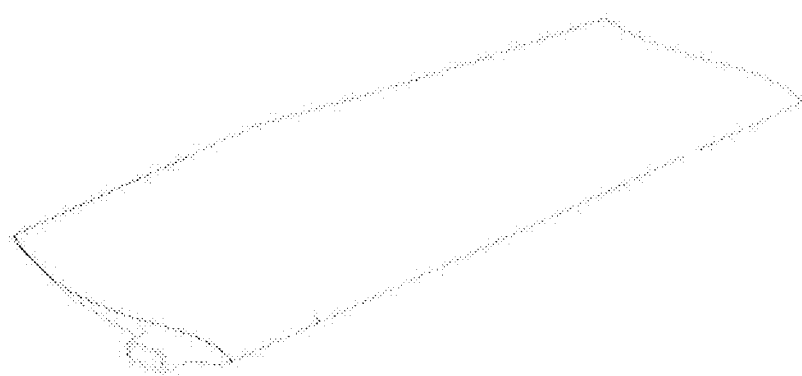
Figure 6a – Prior art

BLADE FOR INDUSTRIAL AXIAL FAN AND INDUSTRIAL AXIAL FAN COMPRISING SUCH BLADE

CROSS REFERENCE TO RELATED APPLICATION

This application claims benefit under 35 U.S.C. § 371 to international application No. PCT/EP2014/059782, filed on May 13, 2014, the content of which is incorporated by reference in its entirety.

FIELD OF THE INVENTION

The present invention concerns a blade for industrial axial fan and an industrial axial fan comprising such blade.

The axial fans for industrial applications typically comprise a hub and one or more blades, the blades basically comprising two parts, the airfoil having the function to move the air, and the attachment having the function to link the airfoil to the hub.

The attachment can either be an element manufactured separately from the airfoil and then connected to it or it can be an integral part of the blade, being made as a single piece with the airfoil. In the following description the same term "attachment" will used regardless of how it has been made with reference to the airfoil.

Obviously the attachment has to withstand the loads originated when the fan is in operation, which have their peak in this position, therefore the design of the attachment is very critical and affects very much the product's endurance and price. Furthermore, the attachment transmits the vibrations generated by the cyclical loads on the blade to the drive equipment of the axial fan and even to the plant structure. These vibrations create many problems with respect to mechanical dynamic resistance of the components of the axial fan, problems which are very difficult to be solved and that increases the importance of this element.

BACKGROUND

In the field of axial fans, many different technical solutions are known for connecting a blade to the hub of the fan.

In order to briefly discuss the prior art, it is important to appreciate the static and dynamic forces acting on the blades of an industrial axial fan during its operation, and, in particular, with respect to the effect of the centrifugal forces acting on the fan.

Then, we will describe various solutions actually known in the field that have the purpose to decrease the steady and-or the unsteady loads on the element connecting the airfoil profile to the hub of the axial fan.

The forces acting on the blades of an axial fan during operation can be divided in steady forces A) and unsteady forces B).

A) The steady forces, as indicated in the attached FIG. 1a, are the following:
  lift force (L);
  drag force (D);
  centrifugal force (C);
  blade weight (W).

If the blade axis has an angle α with respect to the ideal rotating plane, the centrifugal force clearly will be split in two components, one radial and one perpendicular to the blade plane, having direction opposed to the direction of the lift, as shown in the FIG. 1b.

Consequently, the force perpendicular to the blade plane will be reduced according to the following formula:

$$T = L + W \cdot \cos \alpha - C \cdot \sin \alpha \quad (1)$$

B) The unsteady forces, are those generated by:
  the interaction between the aerodynamic field created around the blade and the structure supporting the fan or the housing comprising it; they are proportional to the steady aerodynamic forces;
  the operation at critical conditions such as blade resonance or structure resonance; their amplitude varies depending on the passive and active damping properties of the blade;
  the interference with the environment like wind or other equipment;
  the vortex wakes created by the blade profile, so that they are self-induced.

Their amplitude cyclically repeats, for that reason they are also commonly called alternated forces.

These forces originate fatigue phenomena, therefore are more dangerous for the blade life when compared to the steady forces.

The attachments actually known in the field and used on the market to decrease the steady and/or the unsteady loads generated by the forces acting on the blades during operation, are represented in the attached FIGS. 2a, 2b, 2c and 2d, and will be herewith briefly described.

A blade comprising a first kind of attachment comprises the rigid connection shown on FIG. 2a: a stiff attachment is used, having a stiffness in the radial direction higher than that of the profile.

The support of the attachment of the blade to the hub is designed so that the airfoil axis is inclined in the vertical plane and has a fixed angle α with respect to the ideal rotation plane. This arrangement as the vertical component of the centrifugal force is opposing the lift, is allowing to decrease the steady loads according the above mentioned formula (1), but has no effect on the unsteady loads.

Another kind of blade attachment known in the art comprises the hinged connection shown on FIG. 2b: a hinge with horizontal axis is acting as a connection between the airfoil and the hub. In this case the airfoil is free to rotate perpendicularly to the fan rotation plane, therefore when the fan is in operation it tends to keep a position where the traction force is balanced by the centrifugal force, minimizing the steady and unsteady loads.

A further blade attachment known in the art comprises a flexible connection constituted by one single element separated from the airfoil, as shown on FIG. 2c, connecting the airfoil to the hub, which has such a high flexibility that it can bend in the vertical plane without being overstressed, reducing both steady and unsteady loads.

Again, a further kind of attachment comprises a flexible connection constituted by two overlapping elements, separated from the airfoil, as shown on FIG. 2d, connecting the airfoil to the hub, which are interacting each other and will bend in a controlled way, in the vertical plane, without being overstressed. Steady and unsteady loads will be reduced.

It must be underlined that in the above described systems, which are today used in the industries, the blade tends to deform or is deforming under the alternated operating loads, modeling a shape (see displacement FIG. 3a) similar to that of a cantilever beam vibrating according to the first vibration mode (see FIG. 3b). This characteristic is entailing that the energy introduced in the blade and consequently transmitted to the hub and then to the structure is amplified. In fact the energy deforming the blade is calculated as follows:

$$E = \int_{r_1}^{r_2} \vec{f}(r) \cdot \vec{ds} \quad (2)$$

Wherein:

$\vec{f}(r)$ is the traction force vector at a given radial section r;

$\vec{ds}$ is the displacement vector of the system at a given radial section r;

$r_1$ is the radial position of the connection between the blade and the hub;

$r_2$ is the blade tip radial position.

In order to better explain the above equation (2), in FIG. 3b it has been schematized the first mode of vibration of a cantilever beam. As it is well-know, the scalar product of two vectors has a positive sign when both of them have the same direction, but it has a negative sign when they have opposite directions; the module of the product is proportional to the amplitude of the two vectors. For the first vibration mode, the displacement s(r) is a monotonically increasing function along the radial span; the applied alternated force f(r) is also a spanwise monotonically increasing function. Therefore, for a system vibrating as the first mode, the integral of equation (2) is the sum of only positive numbers, exponentially increasing in amplitude along the distance (r).

The blades known in the art, especially the ones of FIGS. 2a and 2c, and 2d, under alternated loads have a typical deformed shape of the blade similar to that of a cantilever beam vibrating according the first vibration mode, where the displacement ds of each blade single section increases along the radial span and the alternated force f(r) also increases accordingly. Additionally, both these parameters, the section displacements and the exciting forces, are changing their direction in phase.

Consequently it can be concluded that in such known systems the energy introduced into the blade is amplified and the loads acting on the attachment as well.

SUMMARY OF THE INVENTION

It is therefore the aim of the present invention to provide a blade for industrial axial fans suitable to reduce the energy introduced in the blade and transmitted to the structure.

Within this aim, it is an objective of the present invention to provide an attachment connecting the airfoil of the blade to the hub of an axial industrial fan suitable to minimize the effects of the unsteady loads.

Additionally, it is also an objective of the present invention to provide a blade with an attachment suitable to force the blade being subjected to unsteady loads to vibrate according to a second vibrating mode of a cantilever beam, instead of that of a first vibrating mode as known in the prior art, thus minimizing the effects of unsteady loads.

Another objective of the present invention is to provide a blade for industrial axial fans which can be customized according to the specific operative conditions of the axial fan, varying the geometry of the connecting part according to several different geometric parameters.

In order to achieve this aim and these and other objectives that will became more clear from the following detailed description of preferred embodiments, that are merely illustrative and not limitative of the present invention, the present invention provides to the blade a particular attachment, such to have an inflection point when subject to unsteady operating loads.

Referring to FIG. 4b, it is noted that in the second vibrating mode, the displacement function s(r) has a concavity on one end and a convexity on the opposite end, wherein an inflection point defines the transition point between the concave and convex shaped portions.

Therefore, part of the system is deforming in one direction (zone A in FIG. 4b) and part in the opposite direction. At the opposite, the applied alternated forces have only one direction and their amplitude increases along the radial span; therefore part of these loads are in phase with the deformations, but part of them are in counter-phase with the related deformations. Then for this mode of vibrating, the integral of equation (2) is the sum of positive and negative numbers, which are not continuously increasing.

Accordingly, for the same applied alternated forces as in the first vibrating mode, its value is unquestionably lower than in the previous case.

As a main consequence, in a system deforming under alternated loads in a shape similar to the second mode of a cantilever beam, the energy introduced in the system will be minimized: therefore blades vibrating according the second mode will have the unsteady loads effects minimized.

The target to have the blades vibrating according to the second mode, which is not natural for the blades of an axial fin, has been obtained by forcing the connecting element to deform in a way to have at least an inflection point.

DESCRIPTION OF THE DRAWINGS

Further characteristics and advantages of the present invention will become clear from the following detailed description of a preferred embodiment that is merely illustrative and not limitative and is shown in the figures that are attached hereto, in which:

FIGS. 1a, 1b, 2a, 2b, 2c, 2d show different examples of blades for axial fans according to the prior art;

FIG. 3a shows the two deformed conditions of a blade system of the type known in the art in the operating condition;

FIG. 3b shows a scheme of the displacement of a cantilever beam according to a first vibrating mode;

FIG. 5 represents the variation of the dynamic amplification factor with the frequency rate for different values of the damping factor;

FIG. 6a shows an example of a blade of the type known in the art;

DESCRIPTION OF THE INVENTION

With reference to the above mentioned Figures, the main task of the present invention is to provide a new blade for industrial axial fans, where the blade, subject to unsteady loads, is forced to vibrate in a way similar to that of the second vibrating mode of a cantilever beam.

This result has been achieved by configuring the design of the blade and, in particular, its attachment and/or the airfoil area nearby, to force the blade to have an inflection point when deforming under unsteady operating loads.

Further advantages can be achieved by configuring the blade weight and/or weight distribution.

Figure 4A:
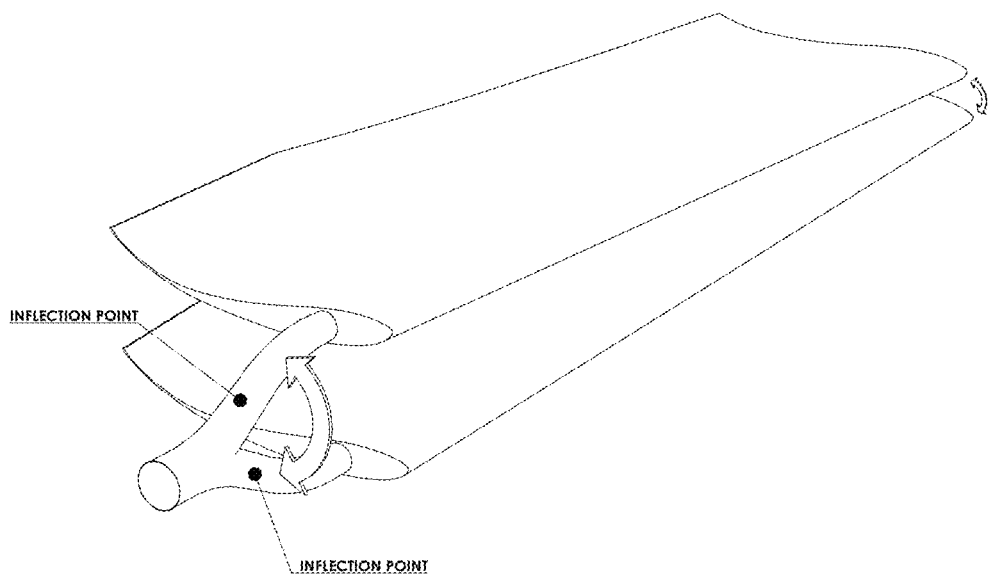
FIG. 4a shows the deformed conditions of a blade according to the present invention.
Figure 4B:
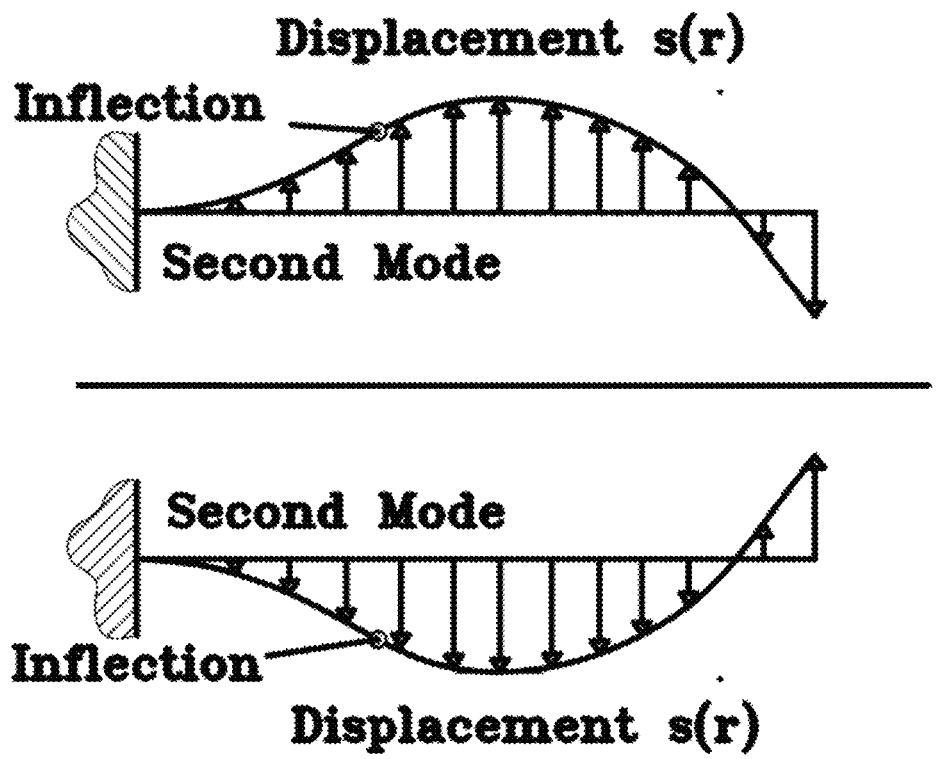
FIG. 4b shows a scheme of the displacement of a cantilever beam according to a second vibrating mode.

The influence of these factors on the behavior of the system is herewith explained. During operation, the alternated forces tend to deform cyclically upward and downward the blade and its attachment. The blade takes naturally a deformed shape as shown in FIG. 4a similar to the second vibration mode, see FIG. 4b. At the same time, the centrifugal force tends to counteract the blade deformation developed according to the first mode. The effect produced by the centrifugal force is linearly dependent on the deformation, whereas the alternated forces are not influenced by deformation.

The stiffness on the attachment plays a key role in with respect to the effectiveness of the centrifugal force. In fact, the stiffness and stiffness distribution of the attachment influences the deformation of the attachment as well as the blade deformation.

An attachment which is stiffer at the hub section and less stiff at the airfoil side amplifies the effectiveness of the centrifugal force.

With a proper variation of the stiffness along the radial direction, an inflection point can be obtained, so that the camber of the deformed blade can be overturned along the radius, allowing the blade to deform similarly to the second vibrating mode.

With respect to the blade weight, the capacity of the centrifugal force to overturn the camber of the deformation depends on its amount and on its radial distribution.

In a typical industrial fan blade the weight distribution is such that it is decreasing from root to tip, because the size and the wall thickness of the airfoil is also decreasing this way.

Therefore the centrifugal force in operation could not be sufficient by itself to generate the requested inflection point in the attachment as desired.

The addition of weights to the tip section amplifies the effectiveness of the centrifugal force and would help the process.

The blade and the axial fan comprising such blade according to the present invention obtain a substantial improvement in reducing the alternated loads with respect to the prior art.

Another important characteristic of the present invention is that it leads to a higher unsteady load resistance when compared to the systems known in the art, including the hinged one, because the span-wise variation of the stiffness, combined with the additional weights at the blade tip, reduce significantly the response of the blade to the alternated loads, particularly at the resonance conditions, as it will be herewith explained.

Considering the blade of the axial fan as a mass-damping-stiffness system and assuming it similar to a simple one-degree-of-freedom (SDoF) system, when the system is dynamically excited with a time dependent force f(t), the equation of motion is the following:

$$mx''(t)+cx'(t)+kx(t)=f(t) \quad (3)$$

Wherein:
m is the blade mass;
c is the damping coefficient;
k is the blade stiffness;
x(t) is the system response;
f(t) is the forcing function.

The solution of equation (3) is the sum of two parts: the homogeneous part describing the free vibration, and the particular part describing the forced response. The free vibrational response of a damped system decays over the time, therefore in a relatively short time the response of the system will correspond to the forced vibration, having the same frequency of the force.

The most common alternated force exciting a fan blade is a simple sinusoidal function with a frequency ω; the equation (3) becomes the following:

$$(-m\omega^2+ic\omega+k)X\,e^{i\omega t}=F e^{i\omega t} \quad (4)$$

Where F and X are respectively the amplitude of the exciting force and the system response. Equation (4) can berewritten in terms of the dynamic variables $\omega_n$ which is the system frequency and δ which is the damping ratio, both defined as follows:

$$\omega_n = \sqrt{\frac{k}{m}} \quad (5)$$

$$\delta = \frac{c}{2\sqrt{km}} \quad (6)$$

$$\frac{X}{X_{st}} = \frac{1}{\sqrt{(1-\Omega^2)^2+(2\delta\Omega)^2}} \quad (7)$$

Where:
$X_{st}$ is the system response to a static load F;
Ω is the frequency ratio between the blade and the force (=ω/$\omega_n$).

The left-hand side term of equation (7) is called the dynamic amplification factor, and it is the factor by which the displacement responses are amplified due to the fact that the external force is dynamic and not static.

The dynamic amplification factor depends on the frequency rate Ω and the damping factor δ. Its variation with the frequency rate for different values of the damping factor is shown in FIG. 5.

At the resonance condition, Ω=1, the factor has its maximum value:

$$\frac{X}{X_{st}} = \frac{1}{2\delta} = \frac{\sqrt{km}}{c} \quad (8)$$

The damping coefficient c depends on the material.

For the present invention, the connecting part stiffness (k) reduction leaves the mass (m) almost unchanged even considering the mass which can be added on the tip of the airfoil, but reduces remarkably the stiffness (k).

In conclusion, with respect to the prior art, the present invention reduces the response to alternated loads in general and in resonance condition in particular.

The present invention can be applied profitably, technically and pricewise, to the whole range of cooling axial fans, from small, i.e. 500 millimeters in diameter, to big size, i.e. 20 meters in diameter, and in both cases when the connecting part is integral with the airfoil and when the attachment is a separated element with respect to the airfoil.

Herewith following will be provided some examples of several preferred embodiments of the present invention.

Figure 6B:
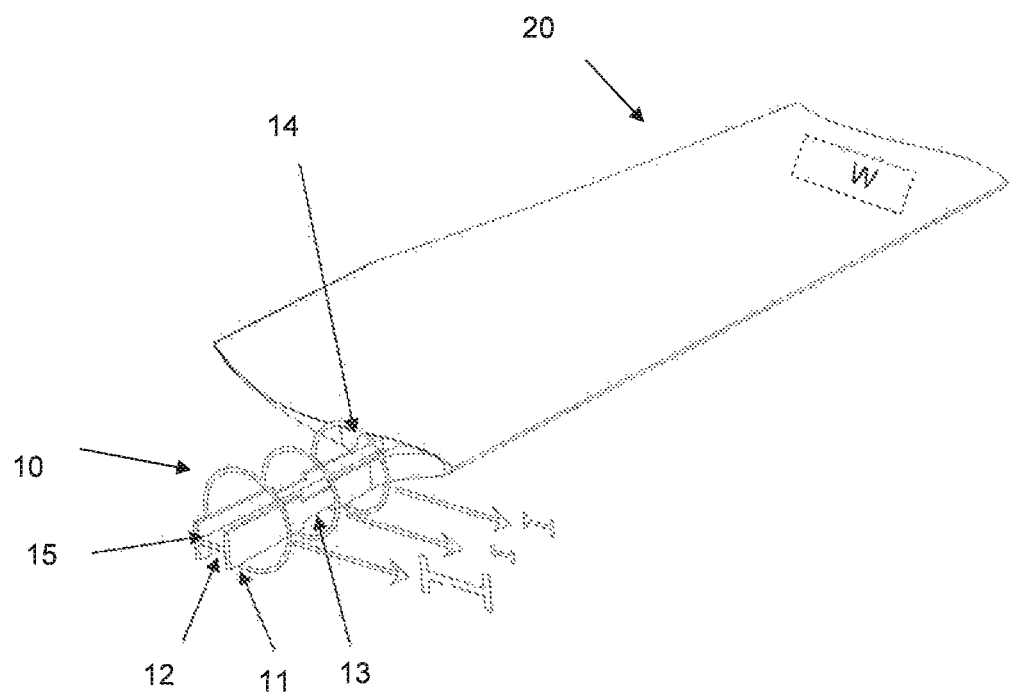
FIG. 6b shows a blade according to a first embodiment of the present invention, particularly for axial fans of small/medium sizes, in which the blade comprises an attachment having a necking zone.

In a first embodiment of the blade according to the present invention a small/medium size blade is considered, the reference being to FIG. 6b.

Small blades are generally realized as one piece cast aluminum, molded plastic, or fiberglass. In FIG. 6a, a typical small blade according to prior art is shown. In FIG. 6b, a blade according to the invention is represented.

The implementation of the invention in this case is rather simple because the material will be injected in a mould and any shape will be easily obtained.

To optimize the required deformation in the embodiment of FIG. 6b, the blade comprises a connecting part 10 which develops mainly along a longitudinal direction, and comprises a first part 11 for the connection to the hub of the axial fan, a second part 14 for the connection to the airfoil 20, a necking zone 13, and two lateral ribs 15. Further, in the embodiment of FIG. 6b the transversal section of the connecting part 10 has an I-shaped profile provided with lateral ribs 15, extending substantially perpendicular with respect to the longitudinal direction of the connecting part 10, and which could decrease in height and width spanwise, i.e. along the longitudinal direction length of the connecting part 10.

That, added to the eventual thickness and width variation of the core part 12 of the connection part 10, will lead the blade to vibrate in the second vibrating mode.

Along the length of the connecting part 10, i.e. along the longitudinal direction, in the area nearby the inflection section it can be left a necking zone 13 where the stiffness is constant and/or lower compared to the stiffness of both the first part 11 and the second part 14, to improve the minimization of loads and to increase the range of operating conditions where the inflection section lies close to the ideal point.

An additional weight can be fixed up at the tip of the blade, leaving a space in a tip cap with a larger thickness.

Figure 7:
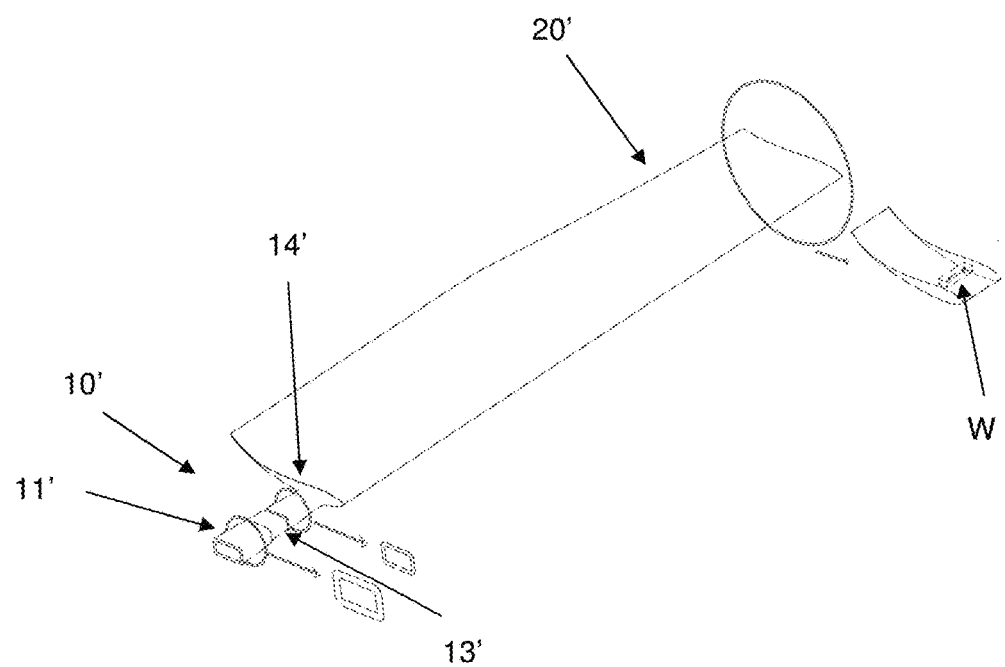
FIG. 7 shows a blade according to a third embodiment of the present invention, particularly adapted in case of axial fans of medium-large size.

In case of medium big blades, i.e. up to 20 meters in diameter of the fan, the connecting part 10' of the blade according to a further embodiment of the present invention shown in FIG. 7 comprises a quadrangular, preferably rectangular, cross-section.

The cross-section of the connecting part 10' decreases along the longitudinal direction, and also the thickness of the rectangular profile decreases along the longitudinal direction, as represented in FIG. 7, from a first part 11' for the connection to the hub of the axial fan to a second part 14' for the connection to a blade or airfoil 20'.

The connecting part can be realized in one single piece, made of fiberglass by means of a mold. In this case generally the structure of the material is made by fiberglass tissue laid in moulds and then impregnated with resin.

A cost effective solution can be a trimmed section as represented in FIG. 7.

As an alternative, to allow the blade to vibrate as the second mode, the inflection section can be induced in the first part of the airfoil, reducing locally the stiffness of the profile wall thickness similarly to what disclosed with reference to the first embodiment of FIG. 6b.

Figure 6C:
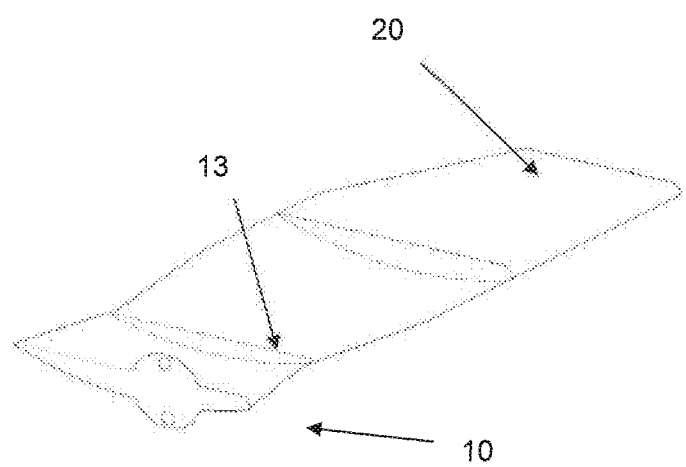
FIG. 6c shows a blade according to a second embodiment of the present invention, in which the airfoil comprises a necking zone.

This embodiment is exemplified in FIG. 6c, wherein the airfoil 20" comprises a necking zone 13". In this case, the airfoil and the connecting part constitutes a single piece.

The same result can be achieved by reducing the wall-thickness of the cross-section of the blade profile, usually the blades having an hollow profile.

As a further option, an additional weight can be fixed at the tip of the alar profile during the molding operation (part "W" in FIG. 7) or fixed up with different methods afterwards.

Figure 8:
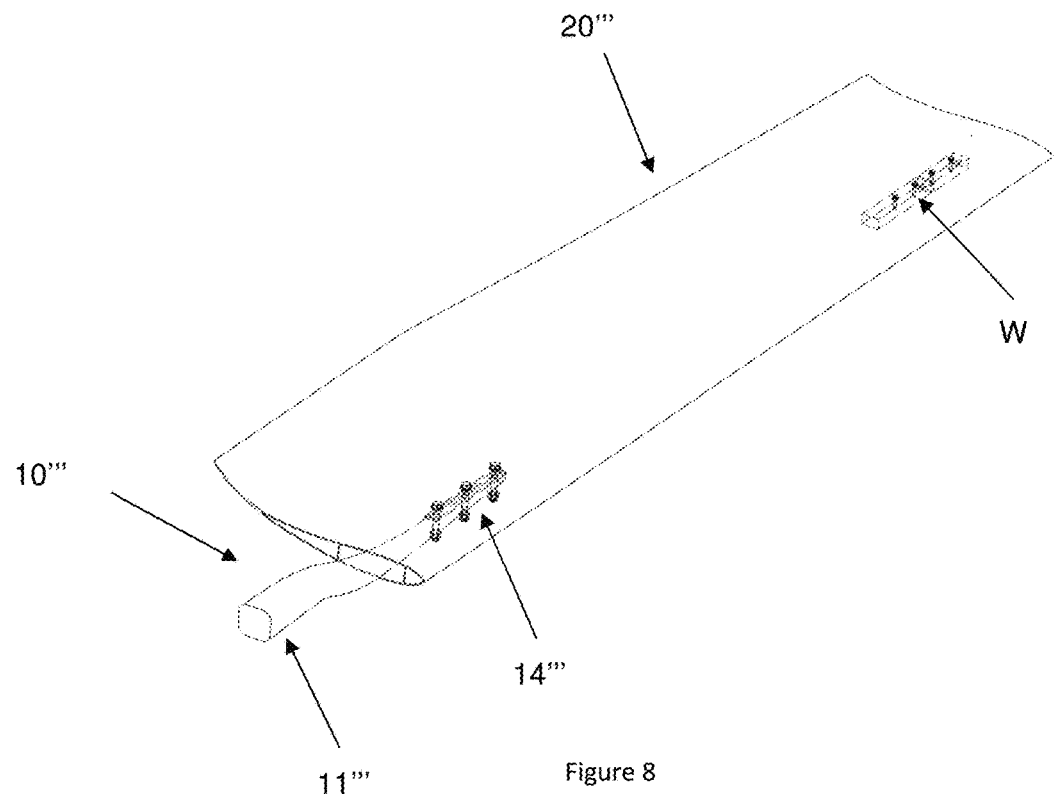
FIG. 8 shows an example of blade according to a fourth embodiment of the present invention comprising an attachment which is provided separately from the airfoil and then connected.

According to a further embodiment of the present invention, the blade can comprise a connecting part 10''' which is realized as a separated part with respect to the airfoil 20''', as shown in FIG. 8.

In this case the connecting part 10''' can be made of fiberglass or an injectable material, and can be connected in various ways internally or externally to the airfoil 20'''.

FIG. 8 shows the connecting part 10''' in a deformed condition, i.e. with the axial fan in an operating condition.

Figure 9:
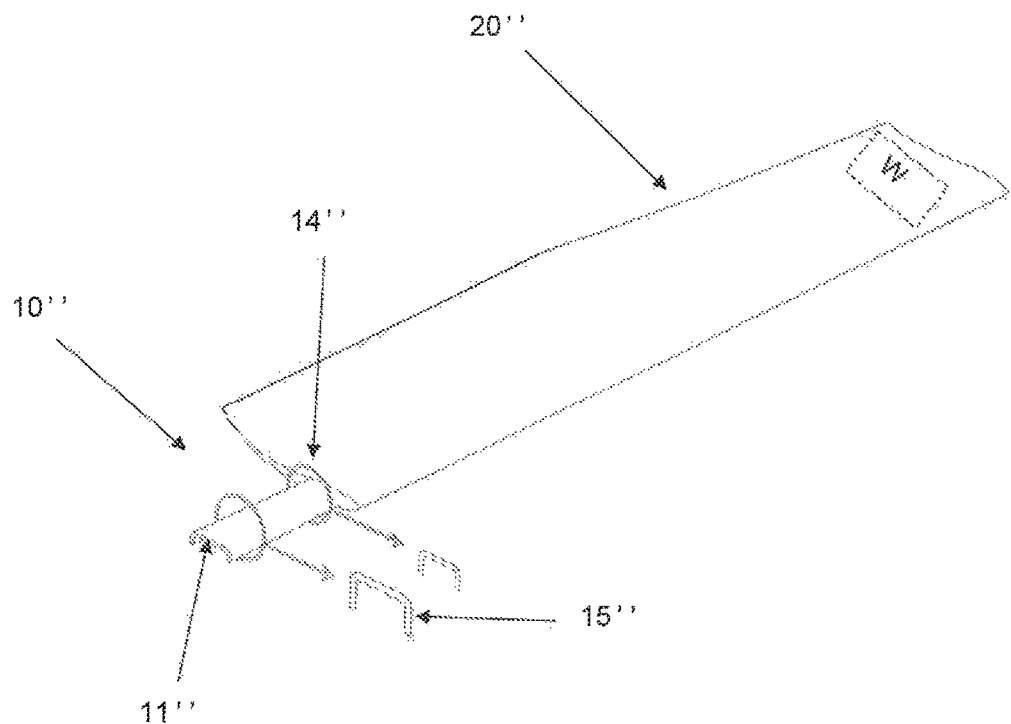
FIG. 9 shows a further embodiment of the blade according to the present invention, characterized by an attachment having a U-shaped transversal section.

A further example of a preferred embodiment of the blade according to the present invention comprises a connecting part 10'''' characterized by a. U section comprising lateral ribs 15'''' as shown in FIG. 9; the width and the lateral ribs can reduce in size spanwise, along the longitudinal direction from a first part 11'''' for the connection to the hub of the axial fan to a second part 14'''' for the connection to the airfoil 20'''', to achieve the desired deformation, with an inflection point in operation.

Several manufacturing systems can be used to produce such a piece; a simple one is cut to size a laminated sheet and then bend it.

The separated connecting part 10'''' will have a section such to be extended inside the airfoil 20'''' more than ten percent to better distribute the deformation on a longer stretch and on the same time decreasing the loads on the profile because the connection is closer to tip.

Of course the portion of the connecting part which is inside the airfoil will have the proper clearance to the airfoil walls to deform without touching it.

Figure 10:
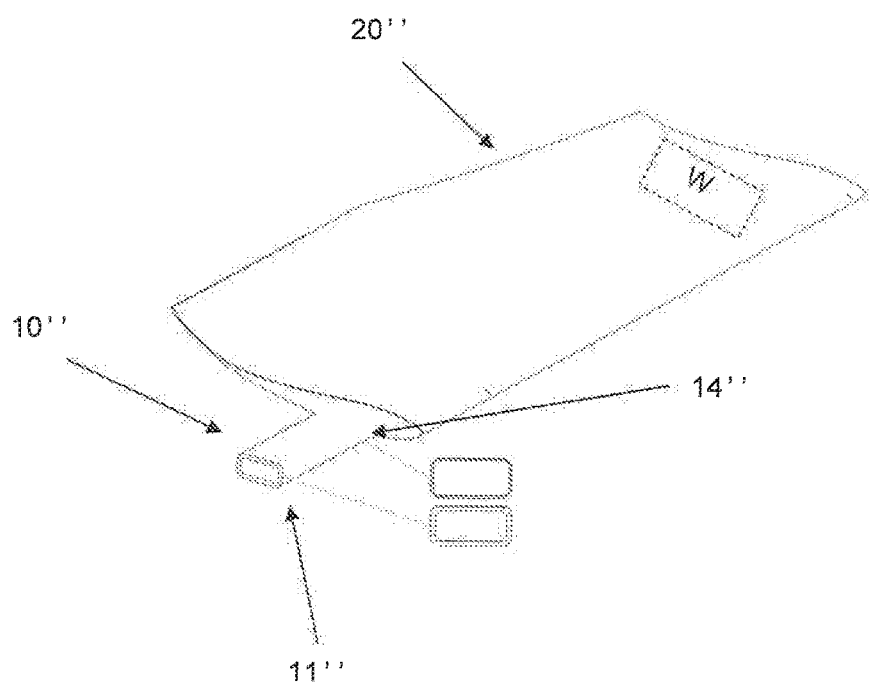
FIG. 10 shows a further embodiment of the blade according to the present invention, characterized by an attachment cross-section having a thickness which decreases along the longitudinal direction of the attachment.

A further embodiment of a blade for industrial axial fan according to the present invention is shown in FIG. 10, wherein the connecting part 10'''' of the blade has an hollow-profile with a quadrangular cross-section, the wall-thickness of said cross-section reducing along the longitudinal direction of the connecting part 10''''', the stiffness of the connecting part decreasing along the longitudinal direction without having a necking zone along the connecting part.

To give some examples, a connecting part of a blade according to the present invention and realized for a small/big size fan to force it to vibrate to the second mode, is provided here below.

For a 10 m diameter fan, the blade will have an overall length of 3.5 m, the stiffness value of the connecting part at the hub connection is 4E10 kgmm2, the ratio of the stiffness at 2 m distance is one fifth of the value at the hub, and the weight at the tip will help the blade to generate a centrifugal force of 34.000 N.

These values could be completely different, for the same fan, when a different type of attachment is used; for example the same effect could be obtained with a three times heavier connecting part and developing a centrifugal force of 60.000 N.

The invention claimed is:

1. A blade for an industrial axial fan comprising: an attachment and an airfoil having a longitudinal axis, said attachment connecting the airfoil to a hub, wherein the attachment has a stiffness and a stiffness distribution that allows the attachment to deform in a way to have at least an inflection point along the longitudinal axis during the operation of the axial fan, wherein said attachment comprises a first part for the connection to the hub and a second part for the connection to a proximal end of the airfoil; wherein the attachment has a decreasing stiffness along its longitudinal direction from said first part to said second part so that during the operation of the axial fan, the attachment deforms and includes the inflection point to thereby induce the blade to vibrate according to a second vibrating mode.

2. The blade for an industrial axial fan according to claim 1, wherein said attachment comprises a necking zone.

3. The blade for an industrial axial fan according to claim 2 further comprising at least an additional weight fixed at a distal end of the airfoil.

4. The blade for an industrial axial fan according to claim 2, wherein said attachment has an I-shaped profile provided with lateral ribs.

5. The blade for an industrial axial fan according to claim 4 further comprising at least an additional weight fixed at a distal end of the airfoil.

6. The blade for an industrial axial fan according to claim 4, wherein the width and the length of the lateral ribs decrease in size spanwise, along the longitudinal direction.

7. The blade for an industrial axial fan according to claim 6 further comprising at least an additional weight fixed at a distal end of the airfoil.

8. The blade for an industrial axial fan according to claim 1, wherein said attachment has a cross-section with a wall-thickness which decreases along the longitudinal direction.

9. The blade for an industrial axial fan according to claim 8 further comprising at least an additional weight fixed at a distal end of the airfoil.

10. The blade for an industrial axial fan according to claim 1, wherein said attachment comprises a necking zone having a stiffness which is lower compared to the stiffness of both the first part and the second part.

11. The blade for an industrial axial fan according to claim 10 further comprising at least an additional weight fixed at a distal end of the airfoil.

12. The blade for an industrial axial fan according to claim 1, wherein said attachment has a quadrangular cross-section, a rectangular cross-section, a round cross-section, or an oval cross-section.

13. The blade for an industrial axial fan according to claim 12 further comprising at least an additional weight fixed at a distal end of the airfoil.

14. The blade for an industrial axial fan according to claim 1, wherein said attachment has a U-shaped cross-section profile having a pair of lateral ribs.

15. The blade for an industrial axial fan according to claim 14 further comprising at least an additional weight fixed at a distal end of the airfoil.

16. A method for the reduction of the energy transmitted from the blade in accordance with claim 1 to a structure of the industrial axial fan, the method comprising the step of providing the attachment for connecting the blade to the hub, said attachment having the stiffness and stiffness distribution that allows the attachment to deform with the inflection point during the operation of the axial fan.

17. An industrial axial fan characterized in that it comprises a blade according to claim 1.

18. The blade for an industrial axial fan according to claim 1 further comprising at least an additional weight fixed at a distal end of the airfoil.

19. A method for reducing energy transmitted from a fan blade to a hub of an industrial axial fan, the method comprising providing an attachment for connecting the blade to the hub, wherein said attachment has a stiffness and a stiffness distribution that allows the attachment to deform in a way to have at least an inflection point during the operation of the axial fan, wherein said attachment comprises a first part for the connection to the hub and a second part for the connection to the fan blade, the blade includes a distal end having a weight affixed thereto; wherein the attachment has a decreasing stiffness along its longitudinal direction from said first part to said second part so that during the operation of the axial fan, the attachment deforms and includes the inflection point to induce the blade to vibrate according to a second vibrating mode.

* * * * *